(12) United States Patent
Golias

(10) Patent No.: US 7,591,479 B2
(45) Date of Patent: Sep. 22, 2009

(54) COLLAPSIBLE SUPPORTING STRUCTURE

(76) Inventor: Matthew Golias, 17 Nimmo Street, Middle Park, Victoria 3206 (AU)

( * ) Notice: Subject to any disclaimer, the term of this patent is extended or adjusted under 35 U.S.C. 154(b) by 415 days.

(21) Appl. No.: 10/554,686

(22) PCT Filed: Aug. 13, 2003

(86) PCT No.: PCT/AU03/01025

§ 371 (c)(1),
(2), (4) Date: Aug. 21, 2006

(87) PCT Pub. No.: WO2004/097282

PCT Pub. Date: Nov. 11, 2004

(65) Prior Publication Data

US 2007/0090628 A1    Apr. 26, 2007

(30) Foreign Application Priority Data

Apr. 30, 2003    (AU)  .............................. 2003902058

(51) Int. Cl.
*B62B 7/06*    (2006.01)
(52) U.S. Cl. ..................... 280/647; 280/642; 280/47.38
(58) Field of Classification Search ................. 280/641, 280/642, 647, 650, 47.36, 47.371, 47.38, 280/47.4, 657
See application file for complete search history.

(56) References Cited

U.S. PATENT DOCUMENTS

| 3,873,116 A | 3/1975 | Perego |
| 3,881,675 A | 5/1975 | Matchett |
| 3,936,069 A | 2/1976 | Giordani |
| 3,976,309 A | 8/1976 | Montanelli |
| 4,191,397 A | 3/1980 | Kassai |
| 4,216,974 A * | 8/1980 | Kassai .......................... 280/42 |
| 4,280,716 A | 7/1981 | Vonsbaek et al. |
| 4,294,464 A * | 10/1981 | Ettridge ...................... 280/649 |
| 4,412,688 A | 11/1983 | Giordani |

(Continued)

FOREIGN PATENT DOCUMENTS

AU    24173/62    4/1965

(Continued)

OTHER PUBLICATIONS

Office Action dated Feb. 26, 2009, for U.S. Appl. No. 11/450,036, filed Jun. 8, 2006.

*Primary Examiner*—Christopher P Ellis
*Assistant Examiner*—John D Walters
(74) *Attorney, Agent, or Firm*—Workman Nydegger

(57) ABSTRACT

A collapsible supporting structure (eg the framework of a stroller) comprises a central mounting body (15) having rotatable disc (41). In the supporting arrangement (depicted) front leg (20) extends from the front surface of disc (41) and rear legs (18-19) extend rearwardly from the rear surface of disc (41). When folding the structure for transportation, rotation of disc (41) by approximately 180° brings all three legs (18-20) into an upwardly splayed position. Individual pivoting of legs (18-20) will then bring them into approximate coextension with arms (35-36). Disc (41) in use is locked against rotation, however twisting of a lock on top of body (15) allows pivotal convergence of arms (35-36). The movement of arms (35-36) presses on captive balls that in turn displace radial plungers so they lie within the periphery of disc (41), allowing its rotation.

19 Claims, 9 Drawing Sheets

U.S. PATENT DOCUMENTS

| | | |
|---|---|---|
| 4,834,403 A | 5/1989 | Yanus et al. |
| 5,205,223 A | 4/1993 | Ball et al. |
| 5,257,779 A | 11/1993 | Cone et al. |
| 5,257,799 A * | 11/1993 | Cone et al. .................. 280/642 |
| 5,388,852 A | 2/1995 | Bigo et al. |
| 5,871,185 A | 2/1999 | Phillips et al. |
| 6,513,827 B1 * | 2/2003 | Barenbrug .................. 280/648 |
| 6,550,802 B2 * | 4/2003 | Sheehan ..................... 280/658 |
| 6,820,891 B2 * | 11/2004 | Suga .......................... 280/642 |
| 6,869,096 B2 * | 3/2005 | Allen et al. .................. 280/642 |
| D505,366 S | 5/2005 | Refsum et al. |
| D510,716 S | 10/2005 | Refsum et al. |
| D526,601 S | 8/2006 | Oxseth |
| 7,188,858 B2 * | 3/2007 | Hartenstine et al. ......... 280/642 |
| 7,296,820 B2 * | 11/2007 | Valdez et al. ............... 280/647 |
| 2002/0041083 A1 | 4/2002 | Britton et al. |
| 2003/0025300 A1 | 2/2003 | Maxisch |

FOREIGN PATENT DOCUMENTS

| | | |
|---|---|---|
| CN | 1091370 A | 8/1994 |
| DE | 1 413 478 | 11/1975 |
| DE | 295 06 777 U1 | 7/1995 |
| EP | 0 080 962 A1 | 6/1983 |
| EP | 1 538 062 A1 | 6/2005 |
| EP | 000448568-0001 | 12/2005 |
| EP | 000642640-0001 | 12/2006 |
| FR | 2 164 026 | 7/1973 |
| FR | 2 486 894 | 1/1982 |
| JP | 54-6257 | 1/1979 |
| JP | 54-88541 | 7/1979 |
| JP | 54-102742 | 8/1979 |
| JP | 54-159946 | 12/1979 |
| JP | 55-8964 | 1/1980 |

* cited by examiner

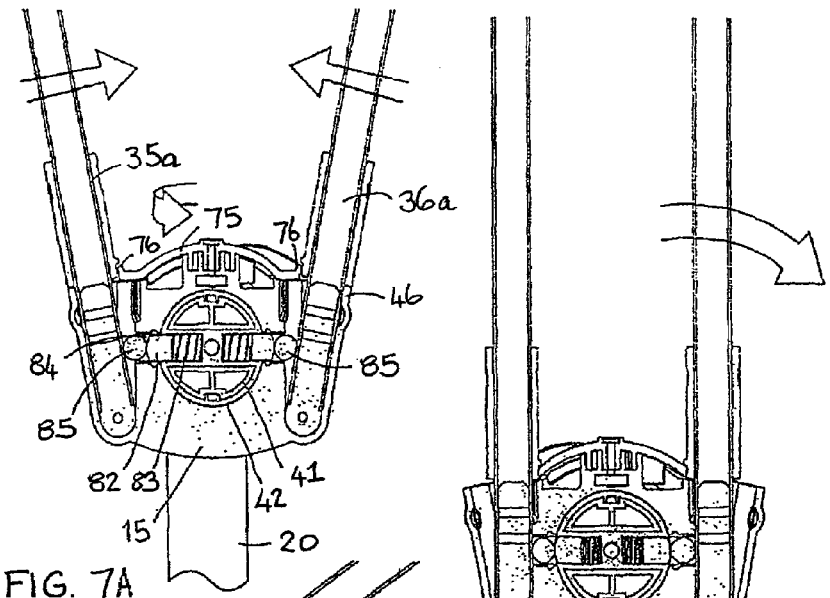
FIG. 7A
FIG. 7B
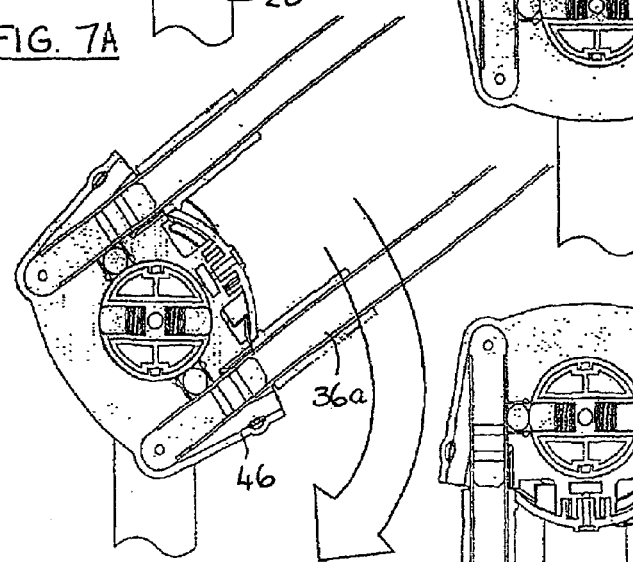
FIG. 7C
FIG. 7D

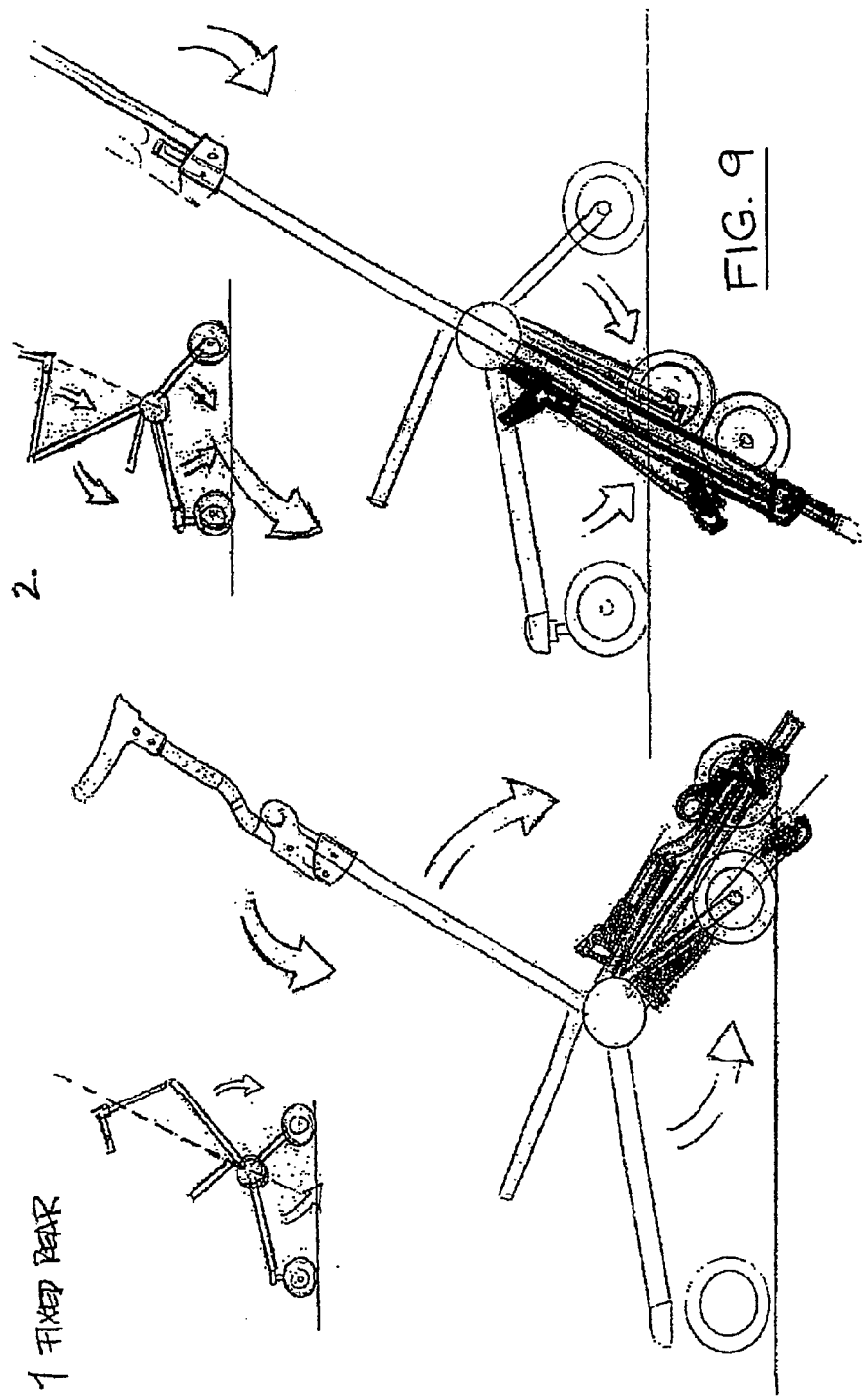

COLLAPSIBLE SUPPORTING STRUCTURE

FIELD OF THE INVENTION

This invention relates to a collapsible supporting structure for supporting articles such as golf buggies, perambulators, strollers, push chairs, push carriers, and shopping trolleys. However it is not limited to such articles being wheeled structures but can be used for other collapsible structures which are needed to support a weight.

BACKGROUND ART

It is often necessary to support weights at various locations. Structures which fulfil the ability to support a load can be large heavy and cumbersome and are therefore not readily transportable to another location.

It is therefore an object of the invention to provide a structure which is able to support a load but is readily transportable.

BRIEF DESCRIPTION OF THE INVENTION

In accordance with the invention there is provided a collapsible supporting structure having: a mounting body; a supporting frame mounted on the collapsible supporting structure for supporting a load; and at least one support leg connected to the mounting body by one or more connection means which enable the at least one support leg to move from a first supporting position in which the support leg extends in a first direction and allows loads to be supported on the collapsible supporting structure to a second transportable position in which the support leg extends in a second direction and allows ready transportability.

The collapsible supporting structure can include a plurality of support legs with each connected to and extending from the mounting body. The legs can be arranged having at least one support leg extending from a front portion of the mounting body to form front supporting legs and at least one support leg extending from a rear portion of the mounting body to form rear supporting legs.

The support legs of the collapsible supporting structure can have at least one wheel mounted on respective distal ends to the end connected to the mounting body.

The collapsible supporting structure can include upright arms extending in a direction on an opposing side to the extension of the at least one support leg. The upright arms allow for manoeuvrability of the collapsible supporting structure.

The connection means can include a rotation means which allows the at least one support leg to move from the first supporting position to the second transportable position by being rotated. The amount of rotation can be up to 180° such that the first supporting position is opposite the second transportable position. This can allow for substantial co-extension of the support legs and the upright arms which substantially decreases the volume of space used by the collapsible supporting structure in the collapsed transportable position relative to the useable supporting position.

The connection means can include pivoting means allowing for pivotal movement of the at least one support leg from a supporting position at an angle to the mounting body to a collapsible position adjacent the mounting body.

In one form the support legs are connected to the mounting body by connection means having rotation means and pivoting means such that the support legs can extend from the mounting body in a first splayed arrangement which forms the supporting position of a load to a second arrangement in which the support legs are pivoted inwards to substantially extend alongside the mounting body and rotated such that the support legs extend substantially alongside the upright arms.

The rotation means can include a disc mounted in the mounting body to allow rotation therein. An end of one or more support legs can be connected to the disc allowing rotation of the support leg. At least one of the support legs can be mounted on each side of the disc of the mounting body allowing for rotation of the attached support legs at the same time.

The rotation means can include a disc having two parts each with an outside surface and an interconnecting part. The rotation means is mounted in a hole in the mounting body with the two interconnecting parts engaging each other within the hole and the two outside surfaces being visible from the outside of the mounting body and able to have support legs attached thereon. The rotation means enabling simultaneous rotation of legs on either side of the mounting body. The rotation means can include locking means to selectively allow simultaneous rotation or separate rotation or independent rotation.

The pivoting means can include a hinge for connecting the support leg to the mounting body and preferably to the disc of the rotation means. The pivoting means can include a limiting shoulder piece fixed to the mounting body adjacent the hinged connection of the support leg and limiting the amount of pivot away of the support leg away from the mounting body. In this way the pivoting means can allow the support leg to pivot to the required splayed supporting position while allowing the support leg to move in towards the mounting body to a transportable position.

The supporting frame can be integral with the mounting body.

In another form the supporting frame is a collapsible structure which can be modified from a voluminous supporting structure to a minimised volume transportable structure. The supporting frame can be mounted on the upright arms of the collapsible structure.

Also in accordance with the invention there is provided a collapsible supporting structure in the form of a stroller or push chair, the structure including: a mounting body; elongated support legs pivotally and hingedly mounted on the mounting body and each having at least one wheel mounted on respective distal ends to the end connected to the mounting body; a supporting frame mounted on the mounting body for supporting a load; a plurality of support legs arranged with at least one support leg extending from a front portion of the mounting body to form front supporting legs and at least one support leg extending from a rear portion of the mounting body to form rear supporting legs; upright arms extending in a direction on an opposing side to the extension of the at least one support leg; the support legs connected to the mounting body by one or more connection means which enable the at least one support leg to move from a first supporting position in which the support leg extends in a first supporting direction and allows loads to be supported supporting frame on the collapsible supporting structure to a second transportable position in which the support leg extends in a second transportable direction and allows ready transportability.

The connection means can include a rotation means which allows the at least one support leg to move from the first supporting position to the second transportable position by being rotated. The amount of rotation can be up to 180° such that the first supporting position is opposite the second transportable position. This can allow for substantial co-extension of the support legs and the upright arms which substantially decreases the volume of space used by the collapsible supporting structure in the collapsed transportable position relative to the useable supporting position.

A substantial benefit in having rotation of the front and rear support legs and attached wheels from a downwardly ground engaging orientation to an upwardly coextensive position with the upright arms is that the weight of articles being supported is on the splayed arrangement with fixed stops providing limited pivotal movement. This means the support is not based on release catches or the like which would have to be substantially stronger and more complex than in the rotation version.

However the invention in the broadest sense provides this mounting of the front and rear legs and upright arms from a central mounting body in such a manner the legs and arms can be moved to a substantially coextensive position to minimise carrying volume.

BRIEF DESCRIPTION OF THE DRAWINGS

In order that the invention can be more readily understood an embodiment will be described by way of illustration only with reference to the drawings wherein:

FIGS. 7A, 7B, 7C, and 7D are vertical cross sections of part of the collapsible supporting structure of FIG. 1 around the mounting body in various stages of operation of collapsing mechanism;

FIGS. 8, 9 and 10 show separate other embodiments of a collapsible supporting structure in accordance with a different aspect of the invention with different folding arrangements that do not require a rotation mechanism.

DESCRIPTION OF EMBODIMENT OF THE INVENTION

Figure 1:
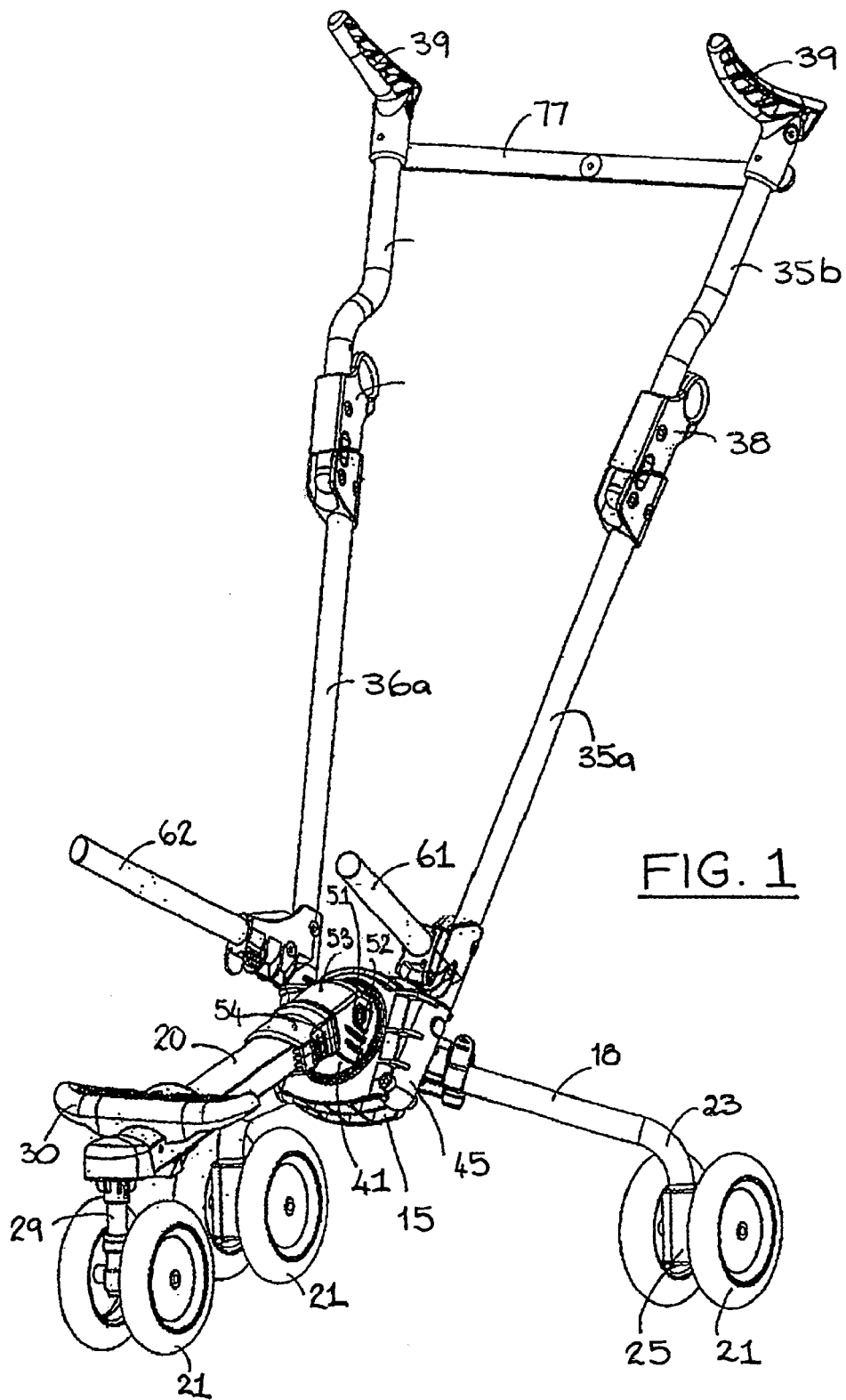
FIG. 1 is a perspective view of a collapsible supporting structure in an open configuration in accordance with a first embodiment of the invention.

Referring to the drawings there is shown a collapsible supporting structure in the form of a stroller or push chair 11.

The structure includes a mounting body 15 and two rear elongated support legs 18 and 19 and a front support leg 20. The support legs are pivotally connected to and extend from the mounting body 15 in substantially equiangular arrangement with ground engaging wheels 21 attached to each respective distal end. The arrangement of the rear support legs 18 and 19 in the supporting position as shown in FIG. 1 is in a splayed arrangement from the rear of the mounting body 15 with the front support leg extending directly forwards of the mounting body 15. The two rear supporting legs 18, 19 extend at symmetrically opposing angles from the rear of the mounting block 15 such that the three legs provide a tripod-like support of a load. The rear support legs extend outwardly and partly downwardly in a linear arrangement to a curved knee 23 having a cylindrical substantially vertical lower leg 24. A sleeve 25 fixedly mounted between two parallel ground engaging wheels 21 captures the end of the lower leg 24 while allowing swivelling movement of the wheels around the lower leg. The front support leg 20 has a planar cruciform shape with the base of the cross being pivotally connected to the mounting body 15. At the distal end are mounted two adjacent parallel ground engaging wheels 21 on a swivelling mount 28 on a cylindrical wheel post 29 extending from an underneath portion of the support leg 20. The cross member forming the cruciform shape is on an upper surface and acts as a footrest 30.

The mounting body 15 is a substantially paralleliped block having substantially parallel planar front and back surfaces with height and width greater than the depth and with opposing outwardly curved top and bottom sides. The internal structure of the mounting body is honeycombed to provide a strength that is suitable to form the supporting central body that can receive weight from structures mounted thereon and stably pass the weight to the supporting legs and the ground engaging wheels.

The mounting of the support legs 18, 19, 20 to the mounting body 15 are by connection means which have two operative systems. The first operative system of the connection means is a rotation means. The second operative system is a pivotal system.

The rotation means includes a rotating cylindrical disc 41 mounted in the centre of the mounting body 15 and having planar circular front and back faces that are substantially coplanar with the front and back respectively of the mounting body 15. The rotating disc 41 is able to rotate therein around an axis that is normal to the front surface of the rotating disc and mounting block.

An end of each of the support legs 18, 19 and 20 are connected to the rotating disc 41 allowing rotation of each support leg. At least one of the support legs is mounted on each side of the disc of the mounting body allowing for rotation of the attached support legs at the same time. The disc has two parts each with an outside surface and an interconnecting part. The rotation means is mounted in a cavity in the mounting body with the two interconnecting parts engaging each other within the cavity and the two outside surfaces being visible from the outside of the mounting body and able to have support legs attached thereon.

The rotation means enabling simultaneous rotation of legs on either side of the mounting body. The rotation means can include locking means to selectively allow simultaneous rotation or separate rotation or independent rotation.

The second operative system being a pivotal system includes a pivoting means made integral with the connection of the support legs 18, 19 and 20 to the rotating disc 41. This pivoting means for the front support leg 20 comprises a U-shaped pivot guard bracket that has the flat central part attached to the front surface of the rotating disc 41. A pivot pin 52 extends between the sides of the U shaped pivot guard bracket and connect through the base end of the cruciform shaped front support leg 20 to allow pivoting movement thereof. The pivot guard performs further function of limiting sideways flex of the front support leg 20 and still further includes a limiting shoulder piece 53 to limit the amount of pivot of the support leg 20 in one direction relative to the mounting body 15. In this way the pivoting means allows the support leg to pivot to the required splayed supporting position while allowing the support leg to move in towards the mounting body.

The supported structure which is to be supported by the mounting body 15 and the support legs 18, 19 and 20 and wheels 21 are based on upwardly extending arms 35 and 36 mounted on the mounting body. The mounting body 15 apart from having the central rotating disc 41 has side sheaths 45 and 46 on either side of the mounting body which have substantially the same height and depth as the mounting body 15. The internal cavities of the side sheaths are substantially V shaped with a pivot pin near the bottom to connect with and pivotally hold the base of the upright elongated arms 35 an 36 so that the upright arms can pivot from a position alongside one side of the V-shape to a position alongside the other side of the V-shape.

Figure 2:
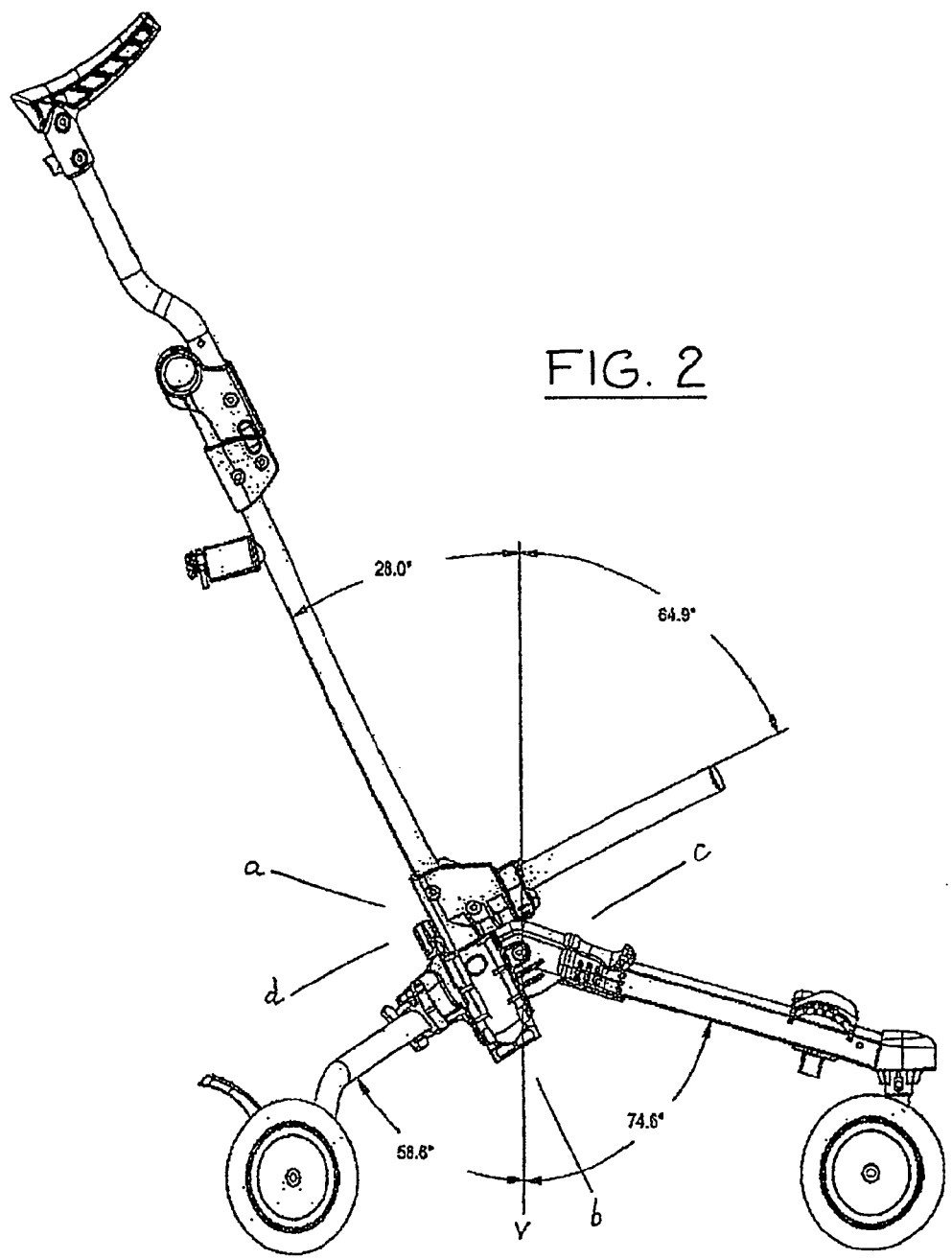
FIG. 2 is a side elevation of the collapsible supporting structure of FIG. 1.
Figure 3:
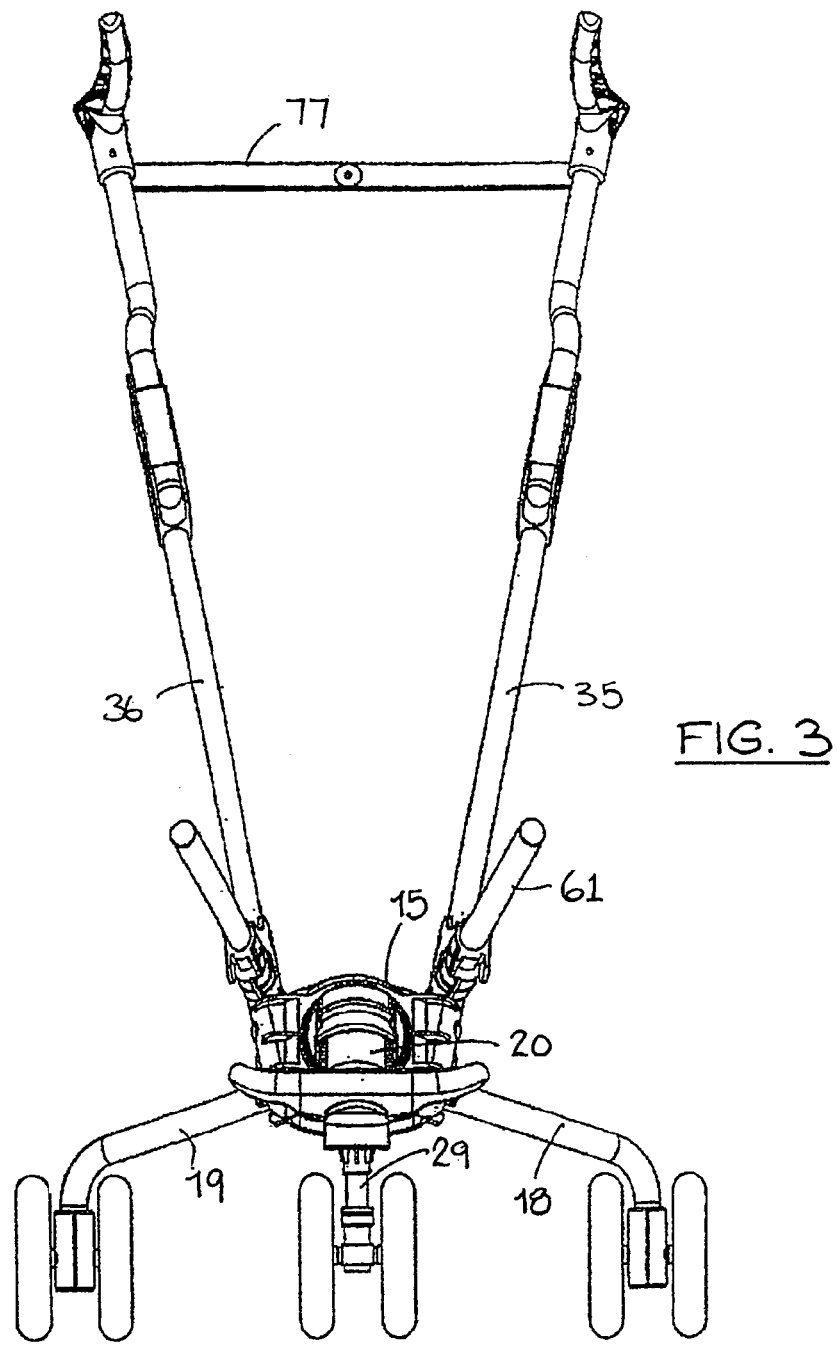
FIG. 3 is a front elevation of the collapsible supporting structure of FIG. 1.

It can be seen particularly in FIG. 2 that the connection of the mounting body 15 on the support legs 18, 19 and 20 results in a reclining angle of the mounting body and the co-linear upwardly extending arms 35, 36 relative to the ground engaging wheels 21 when on a flat horizontal surface.

The upright extending arms 35, 36 comprise lower arm 35a, 36a connected to and extending from the mounting body 15 and joined by respective elbow joints 38 to upper arms 35b, 36b and topped respectively by handles 39. The elbow joints 38 and shape of the upper arms 35b, 36b allow the upright arms to extend substantially in the plane formed by the reclining angle of the mounting body 15.

A support frame 45 in the form of a seat is mounted on the upright arms 35, 36 for supporting a child or other load. This is provided by support posts 61, 62 mounted hingedly on the front of the arms 35, 36. The load can rest against flexible material or other rigid material extending between the posts 61, 62 and flexible material or other rigid material extending between the lower arms 35a, 36a. However a fixed structure such as a car baby capsule or a golf club bag can fit directly onto the framework formed by the support posts and upright arms and even the support legs.

Looking at the operation of the rotation means in detail with reference to FIGS. 7A, 7B, 7C, and 7D there is shown a collapsing mechanism having the features of the mounting body 15 having a central cavity 42 in which the rotating disc 41 is mounted with front and rear legs 18, 19 and 20 attached to front surfaces of the disc 41. Within the rotating discs are linear channels 81 extending on opposite sides of the centre of the disc 41 and within which are springs 82 pushing plungers 81 along the linear channels in an outwardly direction. The plungers 82 thereby extend beyond the circular cavity into adjacent collinear channels 84 extending to the inner V-shaped cavity of the side sheaths in which the upright arms are pivotally mounted. Spacer balls 85 fit partially in the adjacent collinear channels 84 and engage the plungers 82 on one side and the upright arms 35, 36 on the other side above the pivot connection. By this engagement, bending of the cross brace 77 and pivotal convergence of the upright arms 35, 36 will push the spacer balls 85 against the plunger such that at the innermost position of the upright arms 35, 36 within the V-shaped cavities of the side sheaths 45, 46 the plungers are just within the circular cavity 42 holding the rotating disc and therefore allow rotation thereof.

To prevent accidental rotation of the rotating disc 41, a twist lock 75 is mounted on the top surface of the mounting body 15 between the upright arms 35, 36 which has a first length with abutment ends 76 where the first length is sufficient to have the abutment ends 76 engage the upright arms 35, 36 in a maximum converging position defined by the limitations of movement within the V-shaped cavity of the side sheaths 45, 46. By the twist lock having a smaller length and being able to rotate and thereby disengage the upright arms, the arms are able to pivotally converge and act in opposition to the spring loaded plungers 82 and thereby allow rotation of the rotating disc 42 and attached front and rear support legs.

Therefore it can be seen that the stroller or push chair 11 includes a plurality of elongated linear support legs 18, 19, 20 with each connected to and extending from the mounting body 15. The legs are arranged having one front support leg 18 extending from a front portion of the mounting body 15 and two support legs 19, 20 extending from a rear portion of the mounting body 15. The stroller or push chair 11 further includes two linear upright arms 35 36 with handles at an upper end and connected in pivotal arrangement within the cavity of the mounting block 15.

Each of these features is capable of movement. The front support leg 20 is able to pivotally move from an outwardly splayed position to a position substantially adjacent the plane of the mounting body and upright arms. The limiting shoulder piece prevents movement in one direction but allows movement in the other direction. If the plane of the mounting body 15 and upright arms 35, 36 is identified as b-b and is at a reclining angle b° to the vertical then the angle of the front support leg along a-a is at an angle a° to the plane b-b and can pivotally move to coextend substantially parallel to the plane b-b. The front support leg is also able to rotate 180° with the rotating disc 41 of the mounting body 15. In this way the ground engaging wheel can extend from a lower side of the mounting body to be on an upper side of the mounting body 15.

The rear support legs 18, 19 are also able to pivotally move from an outwardly splayed position to a position substantially adjacent the plane of the mounting body and upright arms and rotate 180° with the rotating disc 41 of the mounting body 15. That is they can move from a line c-c at an angle of c° to the plane b-b and can pivotally move to coextend substantially parallel to the plane b-b.

The support posts 61, 62 extending from the lower arms 35a, 36a are able to pivot back to be adjacent and coextensive with the lower arms 35a, 36a. They extend along plane d-d which is substantially at right angles to the plane b-b and can pivotally move to coextend substantially parallel to the plane b-b.

The upright arms 35, 36 extend upwardly from the mounting block 15 in the plane of b-b. However the V shape cavity of the outer side sheaths allow movement of the upper arms 35 36 from outwardly converging along line e-e as shown in FIG. 1 with a cross brace at the top end near the handles maintaining that spacing. However with bending of the cross brace at the predefined central hinge the upright arms 35, 36 can move towards each other at the top end to be substantially parallel. Also the upper arms 35b, 36b are able to pivot at the elbow joints 38 to be adjacent and coextensive with the lower arms 35a, 36a in the plane b-b. The upper arms 35b, 36b can pivotally rotate at the elbow joints 38 180° to coextend with the lower arms 35a, 36a substantially in or parallel to the plane b-b.

The internal side walls of the cavity of the mounting block 15 provide a maximum lateral divergence of the upright arms 35, 36 when in use in a supporting arrangement. The pivotal connection allows the upright arms 35, 36 to converge to substantially coextend for a smaller volume transportable position. In use the upright arms 35, 36 allow for manoeuvrability of the stroller or push chair 11.

In use the stroller or push chair 11 is changeable from a first supporting position in which the support legs 18, 19, 20 extend in a first direction and allow loads to be supported on the collapsible supporting structure to a second transportable position in which the support legs extend in a second direction substantially coextensive with the upright arms 35, 36 and allow ready transportability. The mechanism for such operation is detailed herein.

Each of the support legs 18, 19, 20 are connected to the one mounting body 15 by connection means having rotation means and pivoting means such that the support legs can extend from the mounting body in a first splayed arrangement which forms the supporting position of a load to a second arrangement in which the support legs are pivoted inwards to substantially extend alongside the mounting body and rotated such that the support legs extend substantially alongside the upright arms.

The rotation means allows the support legs 18, 19, 20 to move from the first supporting position to the second transportable position by being rotated. The amount of rotation is up to 180° such that the first supporting position is opposite the second transportable position. This allows for substantial co-extension of the support legs 18, 19, 20 and the upright arms 35, 36 which substantially decrease the volume of space used by the stroller or push chair 11 in the collapsed transportable position relative to the useable supporting position.

The pivoting means of the connection means allows for pivotal movement of the attached support legs 18, 19, 20 from a supporting position at an angle to the mounting body to a collapsible position adjacent the mounting body.

One form of the systematic steps for conversion from the first supporting position allowing loads to be supported on the collapsible supporting structure to a second transportable position is by:

i. Rotate the support posts 61 around pivotal connection to the lower arms 35a, 36a so as to be coextensive with the lower arms;

ii. Rotate the twist lock 75 on the top of the mounting body 15 between the upright arms 35, 36 to allow them to pivot inwards;

iii. Bend the cross brace 77 between the upright arms 35, 36 and converge them towards each other to a substantially parallel relationship which allows rotation of the rotating disc 41 by opposing operation of the lock by the spring loaded plungers 82 back within the circular cavity 42 in which the rotating disc 41 is mounted;

iv. Simultaneously rotate the front and rear support legs 18, 19 and 20 by rotation of the rotating disc 41 of the mounting body such that the wheels are no longer ground engaging and are now splayed upwards relative to the usual in use position;

v. Release the locking mechanism of the front post by sliding the circumferential cover 54 along the front leg 20 away from the pivot guard 51 to allow pivotal rotation of the front support post from an outwardly splayed angle a° from the upright arms 35, 36 to be parallel and coextensive with the lower arms;

vi. Pivotally rotate the rear support posts from an outwardly splayed angle a° from the upright arms 35, 36 by converging them to be parallel and coextensive with the lower arms; and vii. Pivotally rotate the upper arms 35b, 36b around the elbow 38 to be parallel and coextensive with the lower arms 35a, 35b.

Clearly some of these steps can be undertaken in different orders.

The supporting frame 45 of the stroller or push chair 11 is a seating system which can be modified from a voluminous supporting structure to a minimised volume transportable structure. The supporting frame is mounted on the upright arms 35, 36 of the stroller or push chair 11.

Figure 4:
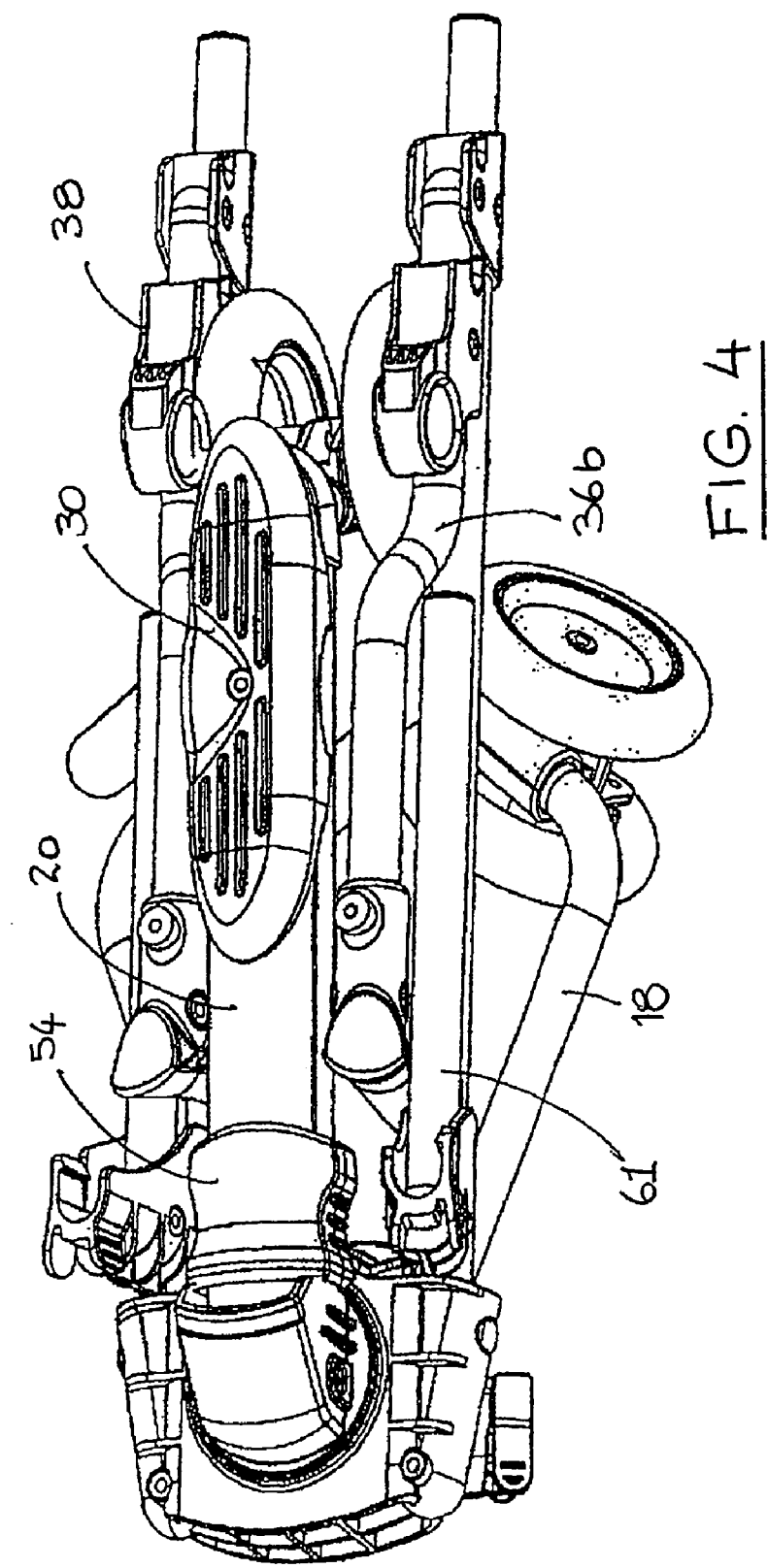
FIG. 4 is a perspective view of a collapsible supporting structure in a closed collapsed configuration in accordance with the first embodiment of the invention of FIG. 1.
Figure 5:
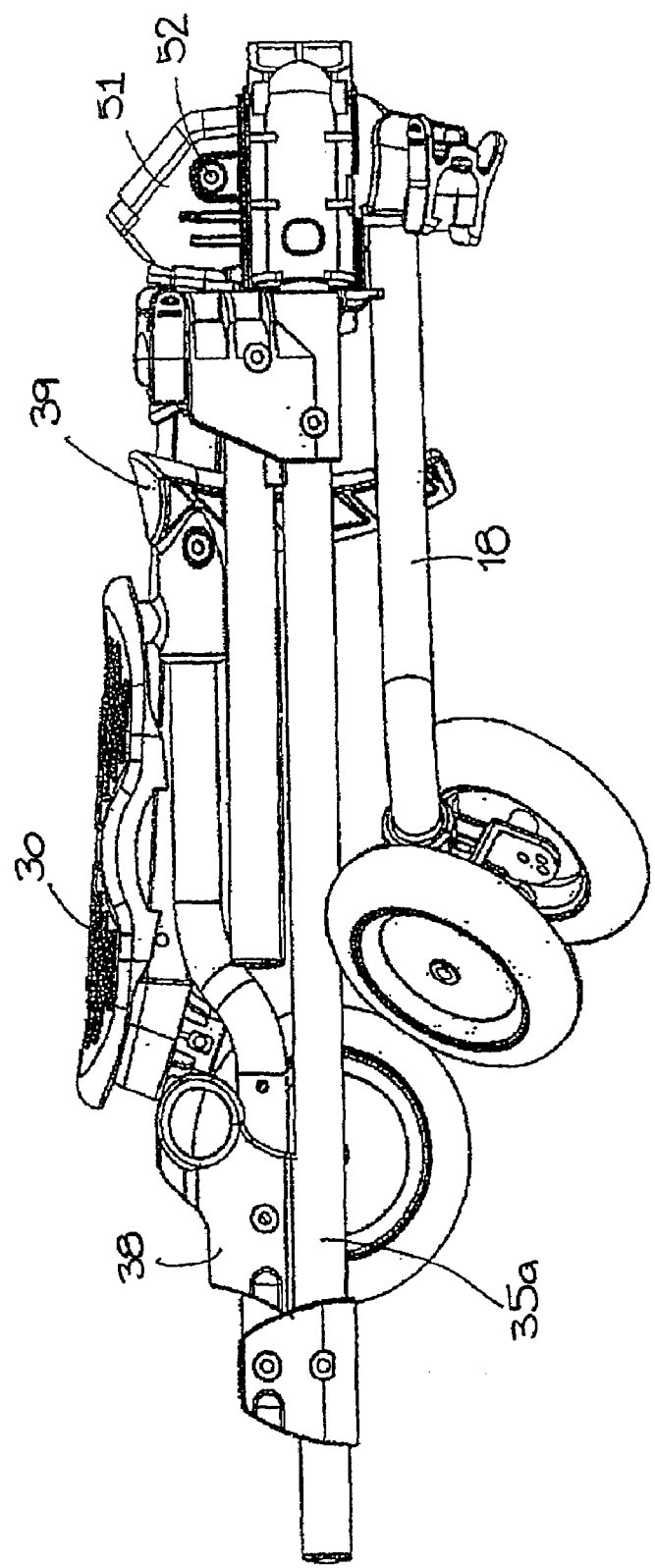
FIG. 5 is a side elevation of the collapsible supporting structure in the closed collapsed configuration of FIG. 4.
Figure 6:
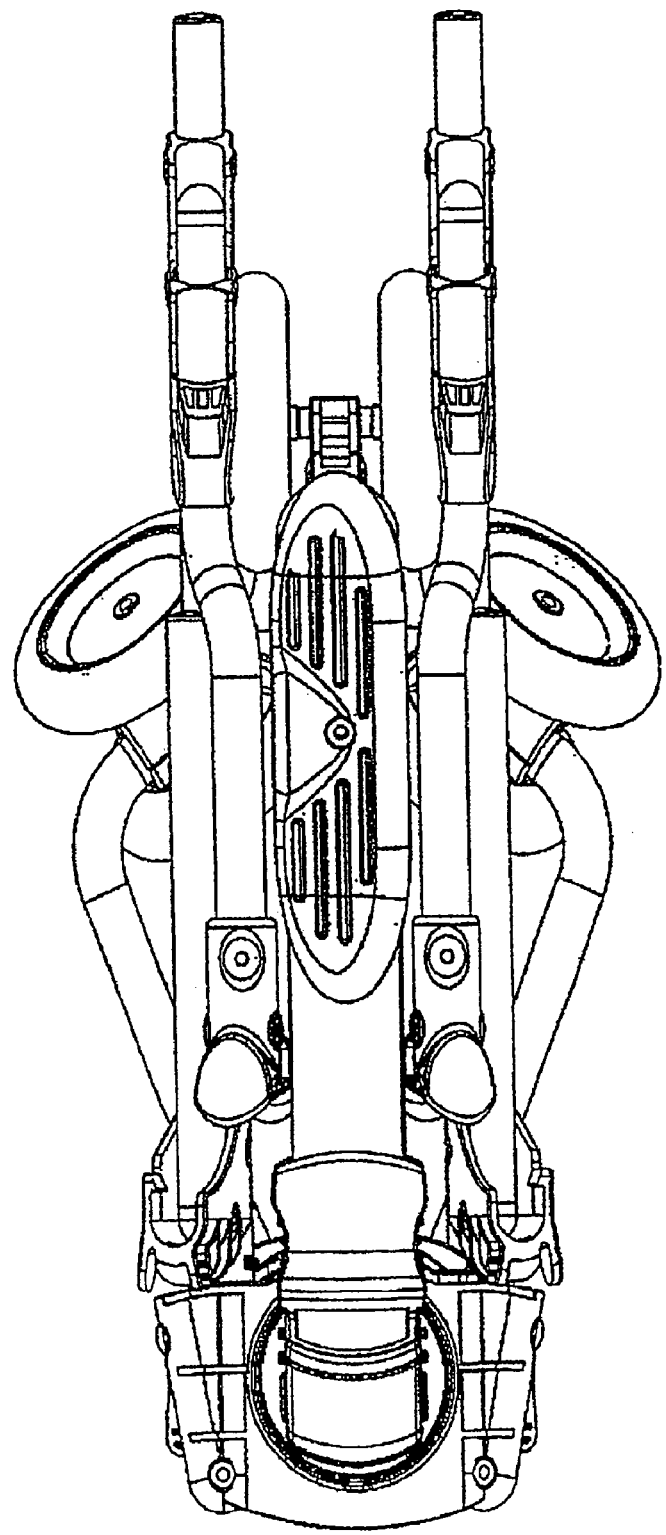
FIG. 6 is an overhead plan view of the collapsible supporting structure in the closed collapsed configuration of FIG. 1.

As shown in FIGS. 4 to 6 the collapsible supporting structure is shown in a collapsed transportable position.

Figure 10:
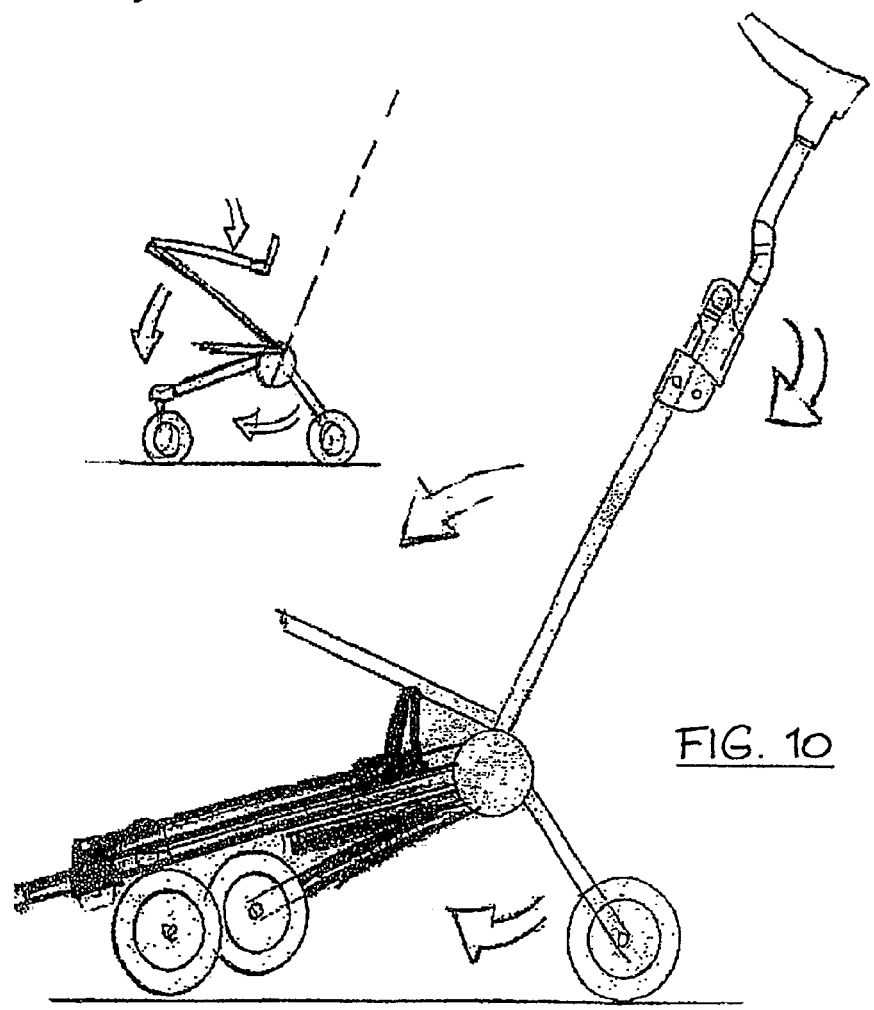

Referring to FIGS. 8, 9 and 10 there are shown various forms of mounting of the front and rear legs and upright arms from a central mounting body in such a manner the legs and arms can be moved to a substantially coextensive position to minimise carrying volume. This can be by rotation of all of the front and rear legs and upright arms in a single plane such that they are, coextensive. The selection of which part remains in fixed position and which other parts need to be rotated to be alongside and substantially co-extensive provide the various forms of these embodiments.

It should be understood that the above description is of a preferred embodiment as illustration only. It is not limiting of the invention. Clearly variations of the collapsible supporting structure as would be understood by a person skilled in the art without any inventiveness are included within the scope of this invention as defined in the following claims.

The invention claimed is:

1. A collapsible supporting structure comprising:
a mounting body;
an upwardly extending supporting frame connected to the mounting body for supporting a load; and
at least one support leg connected to the mounting body by one or more connection means, wherein
the connection means enables the at least one support leg to be movable between a first outwardly splayed position in which the support leg extends downwardly from the mounting body and allows loads to be supported on the collapsible supporting structure; and
a second outwardly splayed position in which the support leg extends upwardly, and wherein
the connection means further enables the at least one support leg to be movable between the second outwardly splayed position; and
a transportable position in which the support leg extends in substantially the same direction as the support frame.

2. A collapsible supporting structure according to claim 1, including a plurality of support legs each connected to and extending from the mounting body.

3. A collapsible supporting structure according to claim 2, wherein the plurality of support legs are arranged having at least one support leg extending from a front portion of the mounting body to form at least one front supporting leg and at least one support leg extending from a rear portion of the mounting body to format least one rear supporting leg.

4. A collapsible supporting structure according to claim 3, and further including a plurality of wheels respectively mounted to the supporting legs at a distal end to the end connected to the mounting body.

5. A collapsible supporting structure according to claim 1, wherein the connection means includes pivoting means for allowing pivotal movement of the at least one support leg from the second outwardly splayed position at an angle to the mounting body to the transportable position adjacent the mounting body.

6. A collapsible supporting structure according to claim 1, wherein the connection means includes rotation means for allowing the at least one support leg to be rotatably moved from the first outwardly splayed position to the second outwardly splayed position.

7. A collapsible supporting structure according to claim 6, wherein connection means enables up to 180 degrees of rotation by the at least one support leg.

8. A collapsible supporting structure according claim 6, wherein the rotation means includes a disc mounted in the mounting body with the at least one support leg attached thereto to allow rotation therein.

9. A collapsible supporting structure according to claim 8, including a plurality of support legs each connected to and extending from the mounting body, wherein the plurality of support legs are respectively mounted to opposing sides of the disc allowing for rotation of the attached support legs at the same time.

10. A collapsible supporting structure according to claim 8, wherein the disc includes two parts each with an outside surface and an interconnecting part.

11. A collapsible supporting structure according to claim 8, wherein the rotation means is mounted in a cavity in the mounting body with the two interconnecting parts engaging each other within the cavity and the two outside surfaces being visible from the outside of the mounting body and able to have support legs attached thereon.

12. A collapsible supporting structure according to claim 9, wherein the rotation means enables simultaneous rotation of legs on either side of the mounting body.

13. A collapsible supporting structure according to claim 11, wherein the rotation means includes locking means for selectively allowing simultaneous rotation or separate rotation or independent rotation.

14. A collapsible supporting structure according to claim 8, wherein the pivoting means includes a hinge for pivotally connecting the support leg to the disc of the rotation means in the mounting body.

15. A collapsible supporting structure according to claim 14, wherein the pivoting means includes a limiting shoulder piece fixed to the mounting body adjacent the hinged connection of the support leg and limiting the amount of pivot of the support leg away from the mounting body.

16. A collapsible supporting structure according to claim 1, wherein the supporting frame includes upright arms mounted to the mounting body.

17. A collapsible supporting structure in the form of a stroller or push chair, the structure comprising:
 a mounting body;
 a plurality of elongated support legs pivotally connected to the mounting body by one or more connection means, each support leg having at least one wheel mounted on respective distal ends to the end connected to the mounting body, the plurality of support legs being arranged with at least one support leg extending downwardly from a front portion of the mounting body to form at least one front supporting leg and at least one support leg extending from a rear portion of the mounting body to form at least one rear supporting leg; and
 an upwardly extending supporting frame connected to the mounting body for supporting a load, wherein
  the connection means enables the plurality of support legs to be movable between a first outwardly splayed position in which the support legs extend downwardly from the mounting body and allow loads to be supported on the collapsible supporting structure; and
  a second outwardly splayed position in which the support leg extends upwardly, and wherein
  the connection means further enables the plurality of support legs to be movable between the second outwardly splayed position; and
  a transportable position in which the support legs extends in substantially the same direction as the support frame.

18. A collapsible supporting structure according to claim 17, wherein the connection means includes rotation means for allowing the plurality of support legs to be rotatably moved from the first splayed position to the second splayed position.

19. A collapsible supporting structure according to claim 18, wherein connection means enables up to 180 degrees rotation by the plurality of support legs to allow substantial co-extension of the support legs and the upright arms which substantially decreases the volume of space used by the collapsible supporting structure in the transportable position relative to a useable supporting position.

* * * * *